(12) United States Patent
Scarborough et al.

(10) Patent No.: US 10,500,911 B1
(45) Date of Patent: Dec. 10, 2019

(54) MODULAR INTERNALLY ACTIVATED TRAILER TONGUE ASSEMBLY

(71) Applicants: Shane Lee Scarborough, Odessa, TX (US); Gayle Y. Scarborough, Odessa, TX (US)

(72) Inventors: Shane Lee Scarborough, Odessa, TX (US); Gayle Y. Scarborough, Odessa, TX (US)

(*) Notice: Subject to any disclaimer, the term of this patent is extended or adjusted under 35 U.S.C. 154(b) by 0 days.

(21) Appl. No.: 16/010,102

(22) Filed: Jun. 15, 2018

(51) Int. Cl.
  *B60D 1/00* (2006.01)
  *B60D 1/26* (2006.01)
  *B60D 1/06* (2006.01)

(52) U.S. Cl.
  CPC .............. *B60D 1/26* (2013.01); *B60D 1/065* (2013.01)

(58) Field of Classification Search
  CPC . B60D 1/60; B60D 1/605; B60D 1/26; B60D 1/065
  USPC ....................................................... 280/507
  See application file for complete search history.

(56) References Cited

U.S. PATENT DOCUMENTS

| | | | | |
|---|---|---|---|---|
| 4,141,569 A * | 2/1979 | Dilk | ................ | B60D 1/60 280/507 |
| 4,571,964 A * | 2/1986 | Bratzler | ................ | B60D 1/60 280/507 |
| 4,648,618 A * | 3/1987 | Utman | ................ | B60D 1/60 280/507 |
| 4,774,823 A * | 10/1988 | Callison | ................ | B60D 1/60 280/507 |
| 5,087,064 A * | 2/1992 | Guhlin | ................ | B60D 1/065 280/432 |
| 5,193,339 A * | 3/1993 | Furuya | ................ | F02D 41/1441 123/674 |
| 5,873,271 A * | 2/1999 | Smith | ................ | B60D 1/60 280/507 |
| 6,070,441 A * | 6/2000 | Bernstrom | ................ | B60D 1/60 280/507 |
| 6,202,453 B1 * | 3/2001 | Disher | ................ | B60D 1/60 280/507 |
| 6,244,614 B1 * | 6/2001 | Bonvillain | ................ | B60D 1/60 280/507 |
| 7,300,068 B1 * | 11/2007 | Johnsen | ................ | B60D 1/065 280/507 |
| 8,556,288 B1 * | 10/2013 | Bale | ................ | B60D 1/60 280/507 |

* cited by examiner

*Primary Examiner* — Tony H Winner
(74) *Attorney, Agent, or Firm* — Law Office of Jeff Williams PLLC; J. Oliver Williams

(57) ABSTRACT

A trailer tongue assembly includes a tongue body, a ball clamp, an actuating device, and a control unit. The tongue body is coupled to a frame and includes a ball socket that defines a socket volume. The ball clamp is located within the tongue body and translates internally within the tongue body so as to selectively protrude into and out of the socket volume. The actuating device is in communication with the ball clamp and is configured to position the ball clamp within the socket volume. The control unit is in communication with the actuating device and is configured to regulate the operation of the actuating device. In all, the tongue body surrounds the ball clamp, the actuating device and the control unit.

20 Claims, 5 Drawing Sheets

MODULAR INTERNALLY ACTIVATED TRAILER TONGUE ASSEMBLY

BACKGROUND

1. Field of the Invention

The present application relates to a trailer tongue assembly for use on a trailer, and more particularly to a linearly translating ball clamp within a trailer tongue used to secure the trailer when not in use.

2. Description of Related Art

When towing trailer, there are a few standard pieces of equipment at play. The tow vehicle typically has a hitch receiver that is mounted to a vehicle and come in some common sizes, namely classes 1-5. A hitch is inserted into the hitch receiver and acts as a linkage between the hitch receiver and the hitch ball. The hitch ball is secured to the hitch and also the hitch receiver. These come in some common sizes, such as 1⅞", 2", 2 5/16", and 3". These three pieces of equipment are used for towing a trailer and are coupled directly to the vehicle.

The trailer in tow is configured to engage the hitch ball with a tongue assembly. The tongue assembly includes a ball socket. The ball socket may be rigidly affixed to the tongue assembly or may pivot about an axis. The hitch ball is passed through and into the ball socket and must be secured in a manner that permits rotational movement around the ball. One method of engaging the ball socket and hitch ball is to pivot/rotate a ball clamp that is rotated up from the bottom of the tongue assembly to cradle the back side of the hitch ball. This ball clamp is able to pivot up to and away from the hitch ball to allow the hitch ball room to enter the ball socket.

A common issue with all traders is that when they are not in use, they can be susceptible to theft as anyone can come around and hook up the tongue assembly to their hitch ball and drive away. Trailer theft results in millions of dollars each year. Common methods of prevention include situating the ball clamp in a closed position such that the opening to the ball socket is too small for a hitch ball to enter. This typically requires and external lock on the outside of the tongue assembly used to prevent pivoting of the ball socket or opening of the ball clamp. However, external locks are easily broken, picked, cut, and removed. Once removed, the tongue assembly operates normally and can be hitched. The thief may then place their own lock on the trailer after the theft is complete. Various steps have been taken to provide unique locks that operate to resist theft attempts but all efforts still necessitate an external lock of some type.

Although strides have been made to provide a better manner of locking the tongue assembly of trailers, shortcomings remain. It is desired that an improved tongue assembly be provided that includes an internal manner of locking within the body of the tongue assembly that is not accessible to a thief.

SUMMARY OF THE INVENTION

It is an object of the present application to provide an internally secured locking mechanism within a trailer tongue assembly. The present application uses a translating ball clamp that runs the length of the tongue assembly body and is inserted into a portion of the ball socket. The location and movement of the ball clamp is operated via an actuating device. A control unit is also housed within the tongue assembly body that regulates operation of the actuating device. The control unit is configured with a transmitter to wirelessly communicate with one or more electronic devices. An owner may lock and unlock the tongue assembly wirelessly without the need of an external lock.

It is a further objection of the present application to include an operational software application for running via the electronic device. Another object is to harness the capability of the translating ball clamp to facilitate operability with hitch balls of different sizes. The control unit may be configured to detect the hitch ball size and provide a corresponding location position for the cup end of the ball clamp in relation to the ball socket. A side pin through the body of the tongue assembly and the ball clamp may be provided to act as a safe guard against potential failure of the actuating device and/or control unit.

Ultimately the invention may take many embodiments but features the ability to create a fully internal means of locking the ball socket by translating the ball clamp into the volume of the ball socket. This is done without external security devices. The equipment used within the assembly of the present application are safe and secure within the body of the tongue assembly where thieves cannot access. In this way, this assembly overcomes the disadvantages inherent in the prior art.

The more important features of the assembly have thus been outlined in order that the more detailed description that follows may be better understood and to ensure that the present contribution to the art is appreciated. Additional features of the assembly will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the assembly in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present assembly. It is important, therefore, that the claims be regarded as including such equivalent constructions insofar as they do not depart from the spirit and scope of the present assembly.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
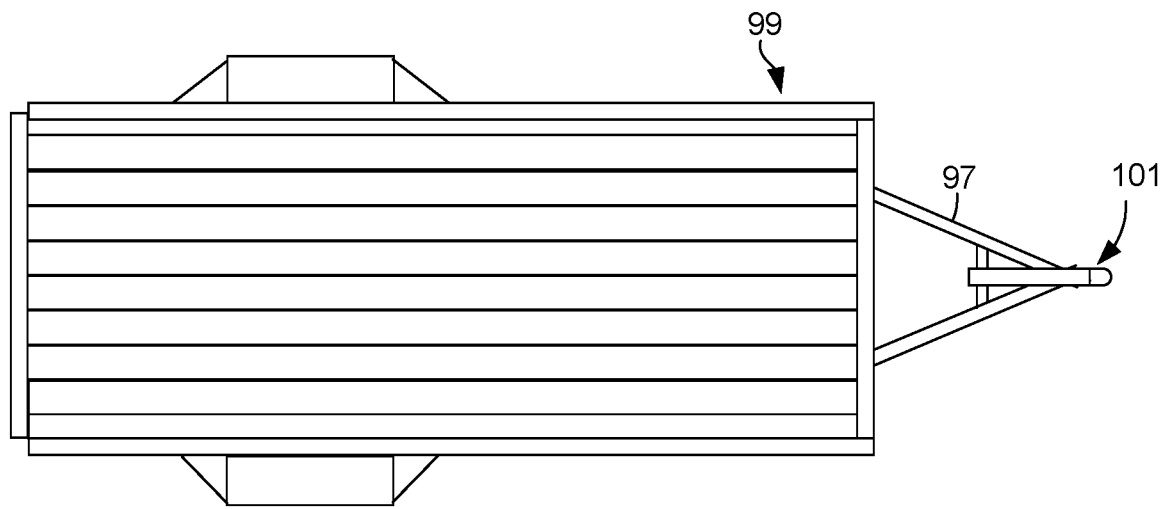
FIG. 1 is a top view of an internally activated tongue assembly according to an embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with assembly-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly and method in accordance with the present application overcomes one or more of the above-discussed problems commonly associated with elevated platforms discussed previously. In particular, the assembly creates a fully internal means of locking the ball socket by translating the ball clamp into the volume of the ball socket. This is done without external security devices. The equipment used within the assembly of the present application are safe and secure within the body of the tongue assembly where thieves cannot access. The assembly is actuated through a remote electronic device. These and other unique features of the assembly are discussed below and illustrated in the accompanying drawings.

The assembly and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The trailer tongue assembly includes a tongue assembly body, a ball clamp, an actuating device, and a control unit. The translating ball clamp that runs along the length of the tongue assembly body and is selectively inserted into a portion of the ball socket. The location and movement of the ball clamp is operated via an actuating device within the tongue assembly body. A control unit is also housed within the tongue assembly body that regulates operation of the actuating device. The control unit is configured with a transmitter to wirelessly communicate with one or more electronic devices. An owner may lock and unlock the tongue assembly wirelessly without the need of an external lock. Additional features and functions of the assembly are illustrated and discussed below.

Referring now to the Figures wherein like reference characters identify corresponding or similar elements in form and function throughout the several views. The following Figures describe the assembly of the present application and its associated features. With reference now to the Figures, an embodiment of the trailer tongue assembly and method of use are herein described. It should be noted that the articles "a", "an", and "the", as used in this specification, include plural referents unless the content clearly dictates otherwise.

Referring now to FIG. 1 in the drawings, a top view of a trailer is provided that has a trailer tongue assembly according to the present application. Trailer tongue assembly 101 is mounted to a frame 97 of trailer 99. Assembly 101 is located at the foremost portion of trailer 99 and is used to releasably couple to a hitch assembly of a tow vehicle so as to permit transportation of trailer 99. Assembly 101 removes the need to use or have external handles, ratchets, couplers, hand-wheels, and the like. The act of securing a hitch ball within a ball socket of assembly 101 is done through internally located components of assembly 101. This acts to eliminate the need of breakable locks and prevent theft of trailer 99.

Figure 2:
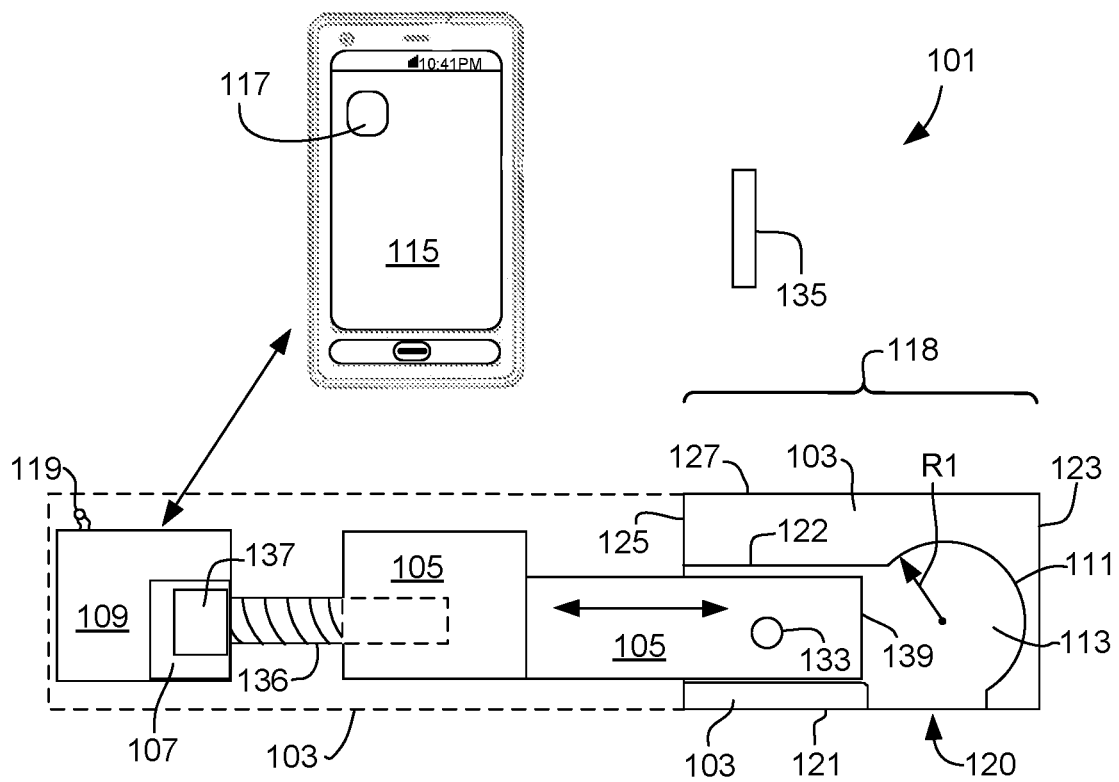
FIG. 2 is a representative side section view of the tongue assembly of FIG. 1 in communication with a remote electronic device.

Referring now also to FIG. 2 in the drawings, a representative side section view of tongue assembly 101 is illustrated. Trailer tongue assembly 101 includes a tongue body 103, a ball clamp 105, an actuating device 107, and a control unit 109. Tongue body 103 is coupled to frame 97 and includes a ball socket 111 that defines a socket volume 113. Ball clamp 105 is located within tongue body 103 and translates internally within body 103 so as to selectively protrude into and out of the socket volume 113. Actuating device 107 is in communication with ball clamp 105 and is configured to position ball clamp 105 within socket volume 113. Control unit 109 is in communication with actuating device 107 and is configured to regulate the operation of actuating device 107. In all, the tongue body surrounds ball clamp 103, actuating device 107 and control unit 109.

Also noted in FIG. 2 is the use of a remote electronic device 115. Assembly includes device 115 as a means of monitoring and controlling the operation of unit 109 and device 107. Device 115 is in electronic communication with a transmitter in control unit 109 and is configured to transmit and receive electronic command data between them. The command data may relate to monitored conditions related to device 107 and clamp 105 through one or more sensors. Examples may include force detection sensors, position sensors, and other similar sensors. Remote electronic device 115 may also include an executable software application 117 that provides a platform for which a user can view data and provide executable command data to unit 109.

Figure 3:
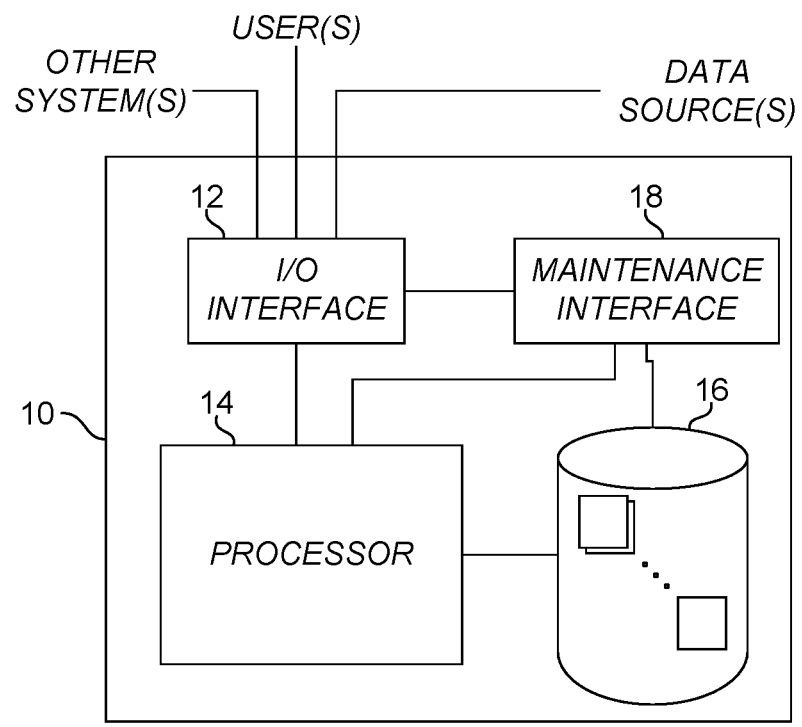
FIG. 3 is a schematic of a representative electronic device used in the tongue assembly of FIG. 1.

Referring now also to FIG. 3 in the drawings, a schematic of a representative computing system 10 and its associated hardware for use within in assembly 101 is illustrated. Computing system 10 illustrates and describes features and capabilities that are equally associated with electronic device 115 and control unit 109 within assembly 101.

The computing system 10 includes an input/output (I/O) interface 12, a processor 14, a database 16, and a maintenance interface 18. Alternative embodiments can combine or distribute the input/output (I/O) interface 12, processor 14, database 16, and maintenance interface 18 as desired. Embodiments of the computing system 10 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks. Furthermore the computers may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of the computing system 10. The I/O interface 12 can be configured for allowing one or more users to input information to the computing system 10 via any known input device. Examples can include a keyboard, mouse, touch screen, microphone, and/or any other desired input device. The I/O interface 12 can be configured for allowing one or more users to receive information output from the computing system 10 via any known output device. Examples can include a display monitor, a printer, a speaker, and/or any other desired output device. The I/O interface 12 can be configured for allowing other systems to communicate with the computing system 10. For example, the I/O interface 12 can allow one or more remote computer(s) to access information, input information, and/or remotely instruct the computing system 10 to perform one or more of the tasks described herein. The I/O interface 12 can be configured for allowing communication with one or more remote data sources. For example, the I/O interface 12 can allow one or more remote data source(s) to access information, input information, and/or remotely instruct the computing system 10 to perform one or more of the tasks described herein.

The database 16 provides persistent data storage for computing system 10. While the term "database" is primarily used, a memory or other suitable data storage arrangement may provide the functionality of the database 16. In alternative embodiments, the database 16 can be integral to or separate from the computing system 10 and can operate on one or more computers. The database 16 preferably provides non-volatile data storage for any information suitable to support the operation of the computing system 10, including various types of data discussed below.

The maintenance interface 18 is configured to allow users to maintain desired operation of the computing system 10. In some embodiments, the maintenance interface 18 can be configured to allow for reviewing and/or revising the data stored in the database 16 and/or performing any suitable administrative tasks commonly associated with database management. This can include, for example, updating database management software, revising security settings, linking multiple devices, and/or performing data backup operations. In some embodiments, the maintenance interface 18 can be configured to allow for maintenance of the processor 14 and/or the I/O interface 12. This can include, for example, software updates and/or administrative tasks such as security management and/or adjustment of certain tolerance settings.

The processor 14 is configured receive communication data from one or more sources and process that data according to one or more user parameters. Examples of parameters could be limitations, warnings, time related functions, spatial restrictions such as location limitations of ball clamp 105, resistive force levels, and so forth. The processor 14 can include various combinations of one or more computing systems, memories, and software components to accomplish these tasks and functions. It is understood that computing system 10 may include an internal power supply or may utilize any external power source via I/O interface 12.

Referring back to FIG. 2 in the drawings, it is understood that control unit 109 and device 115 are capable of both wireless and non-wireless communications. In order to facilitate communications between them, assembly 101 may include an electronic port 119 through a wall (surface 129 in FIG. 4 for example) of tongue body 103. Port 119 is in wired communication with unit 109 and can assist in the transmission of data to and from remote computing systems 10 via interface 12, such as remote electronic device 115. Device 115 may communicate by plugging into port 119. Alternatively, port 119 may be primarily used for the wireless broadcasting and reception of command data, being similar to a transmitter.

Tongue body 103 is coupled to frame 97 and includes a plurality of exterior walls that define a central volume for the positioning and locating of clamp 105, device 107, and unit 109. In particular, body 103 includes a ball socket 111 formed in a front portion 118 of the body. Socket 111 is a circular void space within the side, top, and front walls of body 103. Socket 111 defines socket volume 113 and has a radius (R1). Socket volume 113 is defined as the space or volume of air that is at least within the circular radius R1. Ball socket 111 may have a diameter of 3 inches or more. Additionally, ball socket 111 may have a diameter less than 2.5 inches for example. Other sizes are possible.

Body 103 is has an opening 120 along a bottom surface 121 to permit the passage of a hitch ball from a tow vehicle to pass there through to selectively engage socket 111. Body 103 further includes a hollowed channel 122 extending rearward away from front surface 123. Channel 122 passes into a portion of socket volume 113 and rearward to a rear surface 125 of front portion 118. It is understood that ball socket 111 is configured to receive a hitch ball. The radius R1 is sized to accommodate any size hitch ball and may have a predetermined radius size to match different hitch ball sizes. Opening 120 is configured to be sized to permit hitch balls to pass through it. This may mean that the opening 120 has a diameter of at least twice the value of R1. It is also of note that access to the interior of body 103 is limited to opening 120 and ball socket 111.

Figure 7:
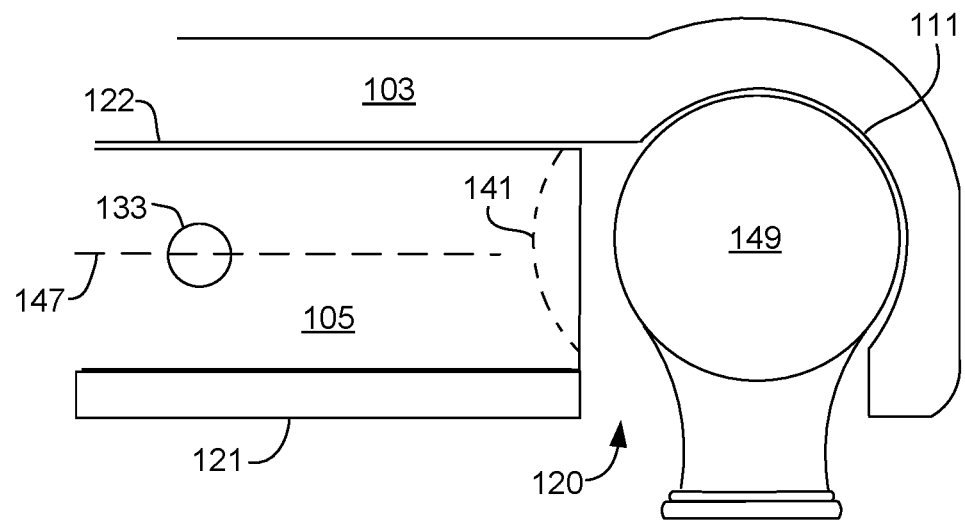
FIGS. 7-9 are an enlarged exemplary side section views of the tongue assembly of FIG. 1 with a ball clamp at different positions.
Figure 8:
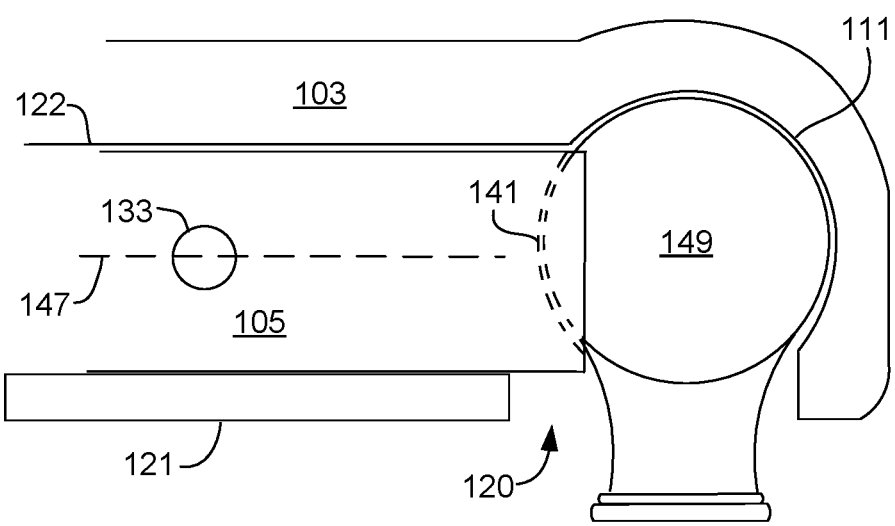
Figure 9:
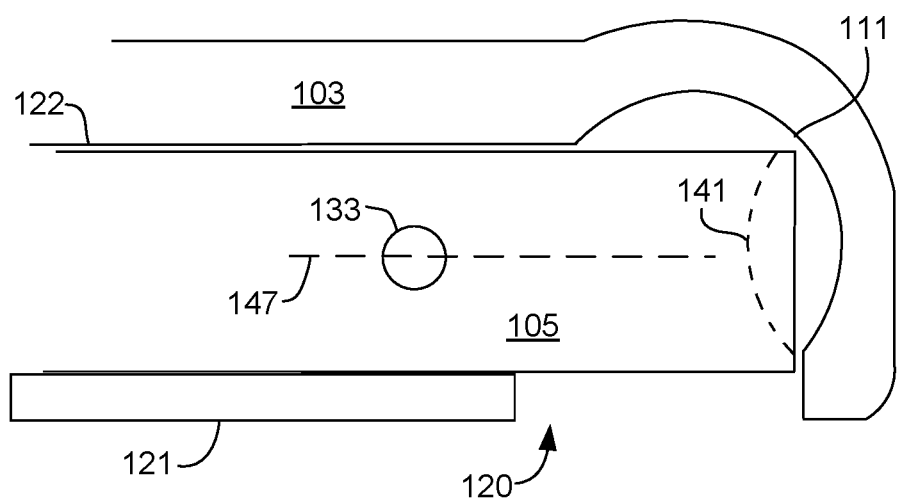

Ball clamp 105 is configured to translate in a linear manner through channel 122 so as to selectively protrude into and out of socket volume 113. As seen in FIG. 2, ball clamp 105 extends rearward beyond rear surface 125 and engages actuating device 107. It is understood that this is only one type of representation seen in FIG. 2 and that ball clamp 103 may alternatively remain within channel 122 and socket 113 such that it fails to extend beyond rear surface 125. It is worth noting now, and as seen in FIGS. 7-9 later, that ball clamp 105 remains generally concealed within body 103 during and after all movements.

Figure 4:
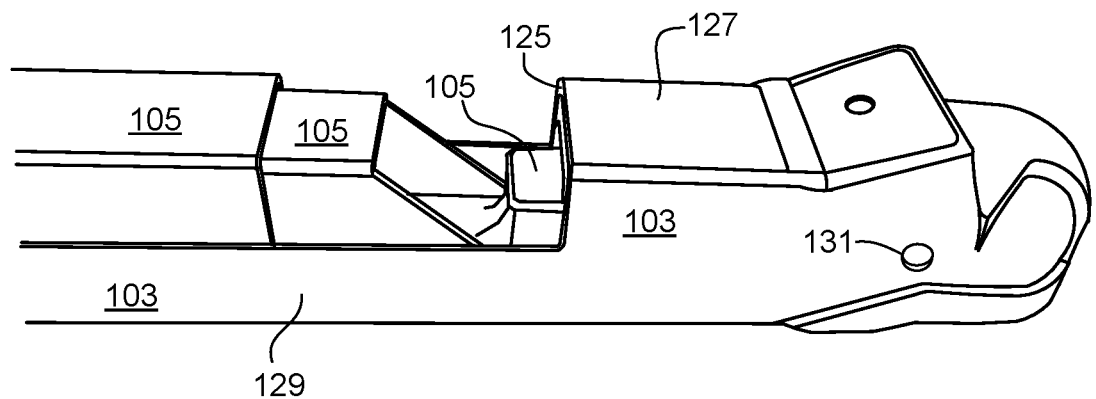
FIG. 4 is an upper perspective view of an embodiment of the tongue assembly of FIG. 1.

Referring now also to FIG. 4 in the drawings, an upper perspective view of a portion of assembly 101 is illustrated. The depicted form of assembly 101 is meant to be exemplary only as it is understood that the external forms of body 103 may be altered in various ways without altering the function of the other parts of assembly 101. A top surface 127 and a side surface of body 103 is shown removed to provide a view within. As seen in FIG. 4, ball clamp 105 may be composed of telescoping members that pass within each other similar to a sleeve arrangement. This telescoping nature is not required.

Body 103 may further include a side hole 131 that passes all the way through surface 129 and its opposing side wall. Ball clamp 105 may further include a side hole 133 that passes there through (FIG. 2). Side hole 133 can align itself with side hole 131 in a selected position of ball clamp 105. A pin 135 may be further included in assembly 101 for passage through side holes 131 and 133. The pin 135 may be secured to restrict undesired or accidental withdrawal. The purpose of pin 135 is to secure ball clamp 135 at a set position. It is understood that clamp 105 may include a plurality of side holes 133. Additionally, body 103 may include a plurality of side holes 131.

Actuating device 107 is in communication with ball clamp 105 and is configured to induce linear movement of ball clamp within channel 122. It is preferred that actuating device 107 is mechanically coupled to ball clamp 105 in some manner such that device 107 acts to automatically restrict movement of clamp 105 when clamp 105 is in a set position. Device 107 would therefore restrict undesired movement of clamp 105 rearward out of socket volume 113.

As described above, pin 135 may act as a secondary assurance that clamp 105 remains in its set position. In some embodiments, actuating device 107 includes an electric motor 137. With an electric motor, clamp 105 may translate as a result of electric impulses, magnetic fields, or other non mechanical methods. In a mechanical set up, the electric motor may include a track, gears, and shafts 136.

Figure 5:
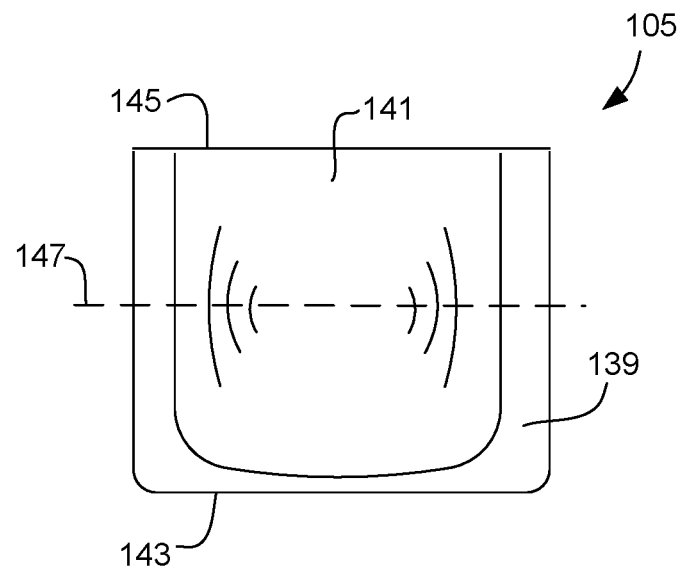
FIG. 5 is a front view of a ball clamp in the tongue assembly of FIG. 1.
Figure 6:
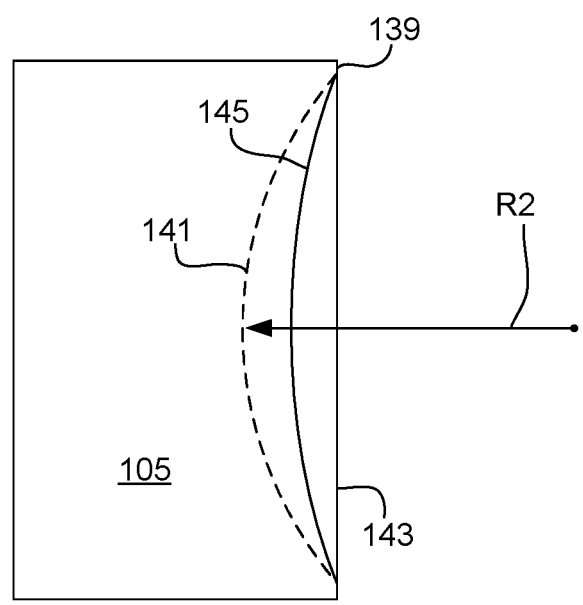
FIG. 6 is a top view of the ball clamp of FIG. 5.

Referring now also to FIGS. 5 and 6 in the drawings, an enlarged front and top view of ball clamp 103 is provided. Ball clamp 105 includes a front face 139 and a cupped recess 141 formed within that face 139. Ball clamp 105 also has a bottom edge 143 and a top edge 145. Recess 141 is situated into face 139 so as to match the curvature of ball socket 111. Ideally, ball clamp 105 is seated lower within body 103 such that recess 141 is elevated with respect to a center plane 147 of ball clamp 105. In operation, the lower set point of ball clamp 105 relative to socket 111 allows clamp 105 to cradle underneath a portion of the hitch ball and prevent it from falling through opening 120. Body 103 may also be formed to curve under a portion of the hitch ball adjacent front wall surface 123 (see FIGS. 7-9). Recess 141 has a defined radius R2. Radius R2 can be larger, smaller, or equal to that of R1. The offset recess location causes edge 145 to be curved when the curvature of recess 141 is great enough. Ideally, edge 143 remain unaffected by recess 141.

Referring now also to FIGS. 7-9 in the drawings, exemplary enlarged side section views of assembly 101 are illustrated around portion 118. These views are illustrative of the types of positions ball clamp 105 may be placed in during operation of assembly 101. As seen in FIG. 7, hitch ball 149 is located within socket 111. Opening 120 is sufficiently sized to permit passage of ball 149. Ball clamp 105 is retracted within channel 122, at a first position, so as to avoid contact with the insertion or removal of hitch ball 149. In FIG. 8, ball clamp 105 is extended forward into a second position so as to contact ball 149 and help to seat it within socket 111. Ball clamp 105 acts to close the relative opening of opening 120 such that ball 149 cannot fall out of socket 111. In FIG. 9, ball 149 is removed to simulate a condition wherein trailer 99 is being stored or not used. At this time, trailer 99 is most susceptible to theft. A third position is shown wherein ball clamp 105 is further extended out into socket 111 and socket volume 113. This position further closes opening 120 and prevents a ball 149 from entering. Also because socket volume 113 is filled from an internal part (clamp 105), there is no need to use an external locking device. Thieves are prevented the luxury of being able to pick a lock or cut it off to open opening 120 sufficient to put a hitch ball therein and steal the trailer. Access is limited to the interior of body 103 except through opening 120.

It is understood that control unit 109 includes a processor to process command data and regulate the performance and operation of device 107. Device 107 may be included within unit 109 or be separate. Also, unit 109 may monitor various conditions within assembly 101. One such capability is for unit 109 to detect the size of ball 149 by tracking the position of ball clamp 105. Additionally, unit 109 may monitor the resistance to movement of ball clamp 105. Any resistance to movement would be a result of contact with ball 149 and its seating in socket 111. Unit 109 can monitor the resistance forces on clamp 105 through one or more sensors and compare them to a predetermined level so as to determine ball size, proper seating, and so forth.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

The invention claimed is:

1. A trailer tongue assembly, comprising:
   a tongue body in communication with a frame of a trailer, the tongue body including a ball socket defining a socket volume;
   a ball clamp within the tongue body and configured to translate therein so as to selectively protrude into and out of the socket volume;
   an actuating device in mechanical communication with the ball clamp and configured to position the ball clamp within the tongue body; and
   a control unit in communication with the actuating device and configured to regulate operation of the actuating device;
   wherein the tongue body surrounds the ball clamp, the actuating device and the control unit.

2. The assembly of claim 1, wherein the socket volume is larger than 3 inches in diameter.

3. The assembly of claim 1, wherein the socket volume is less than 2.5 inches in diameter.

4. The assembly of claim 1, wherein movement of the ball clamp is linear.

5. The assembly of claim 1, wherein the ball clamp remains within the tongue body during and after the movement.

6. The assembly of claim 1, wherein the ball clamp includes a cupped recess along a front face that has a defined radius.

7. The assembly of claim 6, wherein the radius is equal to that of the socket volume.

8. The assembly of claim 6, wherein the radius is not equal to that of a radius of the socket volume.

9. The assembly of claim 1, wherein the actuating device includes an electric motor.

10. The assembly of claim 1, wherein the control unit is configured to detect a size of a hitch ball within the socket volume.

11. The assembly of claim 10, wherein the size of the hitch ball is determined by monitoring a longitudinal location of the ball clamp within the tongue body.

12. The assembly of claim 1, wherein the control unit is configured to monitor a resistive force acting upon the ball clamp and compare the resistive force to a predetermined level.

13. The assembly of claim 1, further comprising:
    a remote electronic device in communication with the control unit for the transferring of electronic command data.

14. The assembly of claim 13, wherein the remote electronic device includes an executable software application for an operation of the control unit.

15. The assembly of claim 13, wherein the tongue body includes an electronic port in communication with the control unit.

16. The assembly of claim 15, wherein the electronic device is configured to plug into the electronic port to communicate with the control unit.

17. The assembly of claim 15, wherein the electronic port facilitates a broadcast and receipt of wireless command data.

18. The assembly of claim 1, wherein an access to an interior of the tongue body is limited to the ball socket.

19. The assembly of claim 1, wherein the ball clamp is secured within the socket volume when not in use.

20. The assembly of claim 1, further comprising:
    a side hole in the tongue body and a side hole in the ball clamp and a pin for passage through the side holes in the tongue body and the ball clamp.

* * * * *